United States Patent Office 3,431,281
Patented Mar. 4, 1969

3,431,281
METHOD OF PREPARING 2-METHYLENE-1,3-DIOXOLANE
Albert R Sawaya, Akron, Ohio, assignor to The Goodyear Tire & Rubber Company, Akron, Ohio, a corporation of Ohio
No Drawing. Filed May 26, 1967, Ser. No. 641,467
U.S. Cl. 260—340.9        3 Claims
Int. Cl. C07d 13/04; C08f 5/00

ABSTRACT OF THE DISCLOSURE

A method of preparing 2-methylene-1,3-dioxolane which does not immediately spontaneously polymerize upon its preparation, by mixing 2-chloromethyl-1,3-dioxolane with a mixture which comprises a solution prepared by mixing liquid ammonia with an alkali metal such as sodium and potassium.

---

This invention relates to the preparation of ketone cyclic acetals. More particularly, this invention relates to the preparation of 2-methylene-1,3-dioxolane.

Heretofore, after preparation, the isolation and storage of 2-methylene-1,3-dioxolane has not been possible. This is primarily because the dioxolane polymerizes spontaneously and immediately after known 2-methylene-1,3-dioxolane preparation methods. The higher the purity of the prepared dioxolane, the more rapidly it spontaneously polymerizes. Thus, it cannot be successfully quantitatively separated from its reaction media in monomer form by heretofore known methods.

It is an object of this invention to prepare 2-methylene-1,3-dioxolane which is easily separable from its reactants as a monomer and can be stored in its monomer form.

In accordance with this invention, it has now been discovered that a method of preparing 2-methylene-1,3-dioxolane which does not immediately spontaneously polymerize upon its preparation comprises mixing 2-chloromethyl-1,3-dioxolane with a mixture which comprises a solution prepared by mixing liquid ammonia and an alkali metal selected from the group consisting of sodium and potassium. It has also been found unexpectedly that 2-methylene-1,3-dioxolane prepared by this method can be separated quantitatively from its reaction media by fractional distillation without immediately spontaneously polymerizing.

In the practice of this invention, 2-methylene-1,3-dioxolane is prepared by the method which comprises mixing 2-chloromethyl-1,3-dioxolane at a temperature of from about —10° to about —50° C. and at about atmospheric pressure with a mixture comprising a solution prepared by mixing from about 1 to about 10 parts or more of sodium and/or potassium with about 50 to about 200 parts or more of liquid ammonia. It is usually preferred to use potassium. Also, pressures above or below atmospheric pressure can be used. Usually the autogenous pressure developed by the reactants is satisfactory. If desired, the 1-chloromethyl-1,3-dioxolane may be added slowly to a solution prepared by mixing sodium and/or potassium and ammonia over a period of time of from about 5 minutes to about 2 hours or more. After the addition of 2-chloromethyl-1,3-dioxolane, the reaction may be allowed to proceed for from about 10 minutes to about 48 hours or more at a temperature of from about —30° C. to about —50° C. If desired, the reaction temperature may be regulated by attaching a reflux means to the reactor and refluxing the ammonia. If the reflux method is used to control the reaction temperature, the reaction pressure may be increased or decreased to above or below atmospheric pressure with the reaction temperature correspondingly increasing or decreasing. When using the reflux method of temperature control at atmospheric pressure the reaction temperature is usually maintained at about —10° C. to about —35° C.

A relatively high purity 2-methylene-1,3-dioxolane product can then be separated or recovered from the mixture by fractional distillation such as, for example, by first degassing the reaction media through application of a vacuum of about 5 to about 200 millimeters of mercury pressure and heating the reaction media, if desired, followed by removal of the product by distillation. It was found that the 2-methylene-1,3-dioxolane prepared by this method and recovered by fractional distillation remained in its monomer form and could be stored as a monomer for at least ten days.

The following examples are given to further illustrate the invention and are not intended to be limiting. All parts and percentages are by weight unless otherwise indicated.

EXAMPLE I

To a solution prepared by mixing 54 parts of potassium and 1500 milliliters of liquid ammonia in a reactor attached to a reflux column in which the ammonia was allowed to reflux at atmospheric pressure was slowly added 198 parts of 2-chloromethyl-1,3-dioxolane. The 2-chloromethyl-1,3-dioxolane was added to the solution over a period of one hour. The reaction was then allowed to reflux for four hours following which it was allowed to stand under a nitrogen atmosphere for about 16 hours at a temperature of from about —10° C. to about —35° C. and at atmospheric pressure. The resulting slush was degassed under a reduced pressure of about 20 milliliters of mercury. Steam heat was then applied to the reactor and the product distilled under the reduced pressure. A 97 percent yield of product was obtained comprising primarily 2-methylene-1,3-dioxolane which had a boiling point of 48° C. to 52° C. at 20 millimeters of mercury pressure.

EXAMPLE II

Sixty-two parts of 2-methylene-1,3-dioxolane product prepared according to Example I was cooled to —20° C. and polymerized by the addition of 0.2 milliliter of boron tributyl under a nitrogen atmosphere. Polymerization started immediately and was allowed to proceed for three days at about —20° C. The resulting polymer was isolated by extraction with ether and then filtered. A 77 percent conversion of the 2-methylene-1,3-dioxolane was obtained to form 48 parts of a white powdery polymer having an inherent viscosity of 0.08. The polymer possessed crystallinity according to X-ray diffraction at a melting point of approximately 275° C. and was insoluble in most common solvents. It was slightly soluble in o-chlorophenol.

EXAMPLE III

A polymerization was carried out as in Example II except that the reaction temperature was 0° C. When a 34 percent conversion of the 2-methylene-1,3-dioxolane was obtained, the polymer product had an inherent viscosity of 0.125.

EXAMPLE IV

The polymer produced according to Example II was treated with 0.3 normal sulfuric acid. A red polymer was formed which had a melting point of approximately 124° C. and was insoluble in acetone and insoluble in methyl alcohol.

In the preparation of 2-methylene-1,3-dioxolane according to the method of this invention, although the complete mechanism is not entirely understood, it is believed that the alkali metal when mixed with the ammonia, forms the alkali metal amide which is probably active in converting 2-chloromethyl-1,3-dioxolane to the 2-methylene-1,3-dioxolane.

The monomer prepared according to this invention was found to be useful in preparing polymers since it polymerizes very readily with free radical and cationic polymerization initiators. As shown in the examples of this specification the monomer was found to polymerize very readily with boron tributyl as an initiator under a nitrogen atmosphere.

The 2-methylene-1,3-dioxolane monomer is also useful in treating various polymers such as, for example, by treating a rubber hydrochloride to increase its thermal stability. An example of such a treatment can be shown by vigorously mixing 0.5 milliliter of 2-methylene-1,3-dioxolane prepared according to the method of Example I with a cement containing 10 grams of polyisoprene hydrochloride in benzene. The mixture was allowed to react at 55° C. for one hour followed by reacting at about 25° C. for 16 hours. A film of the mixture was cast and dried. The film of treated polyisoprene hydrochloride showed a 50 percent increase in thermal stability over a cast film of untreated polyisopreme hydrochloride.

While certain representative embodiments and details have been shown for the purpose of illustrating this invention, it will be apparent to those skilled in the art that various changes and modifications may be made therein without departing from the spirit or scope of the invention.

What is claimed is:

1. A method of preparing 2-methylene-1,3-dioxolane comprising mixing 2-chloromethyl-1,3-dioxolane with a mixture which comprises a solution prepared by mixing liquid ammonia and an alkali metal selected from the group consisting of sodium and potassium.

2. A method according to claim 1 comprising mixing 2-chloromethyl-1,3-dioxolane with a mixture which comprises a solution prepared by mixing from about 1 to about 10 parts of potassium and about 50 to about 200 parts of ammonia at a temperature of from about −10° C. to about −50° C.

3. A method according to claim 2 wherein the 2-methylene-1,3-dioxolane is separated by fractional distillation.

References Cited

McElvain et al.: "Journal of the American Chemical Society," vol. 70 (1948), pp. 3781–86.

ALEX MAZEL, *Primary Examiner.*

J. H. TURNIPSEED, *Assistant Examiner.*

U.S. Cl. X.R.

260—88.3